US012715720B2

(12) United States Patent
Kubo et al.

(10) Patent No.: US 12,715,720 B2
(45) Date of Patent: Aug. 25, 2026

(54) SHEET FEEDER, IMAGE READING DEVICE, AND IMAGE FORMING APPARATUS

(71) Applicants: Hiroshi Kubo, Kanagawa (JP); Ryo Kobayashi, Kanagawa (JP); Ayumu Hashimoto, Kanagawa (JP); Shinya Takai, Kanagawa (JP); Takashi Fujii, Kanagawa (JP); Ryuichi Shirane, Chiba (JP); Takashi Munakata, Kanagawa (JP); Makoto Kurata, Tokyo (JP); Sakiko Tomizawa, Tokyo (JP)

(72) Inventors: Hiroshi Kubo, Kanagawa (JP); Ryo Kobayashi, Kanagawa (JP); Ayumu Hashimoto, Kanagawa (JP); Shinya Takai, Kanagawa (JP); Takashi Fujii, Kanagawa (JP); Ryuichi Shirane, Chiba (JP); Takashi Munakata, Kanagawa (JP); Makoto Kurata, Tokyo (JP); Sakiko Tomizawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/812,240

(22) Filed: Aug. 22, 2024

(65) Prior Publication Data

US 2025/0122036 A1 Apr. 17, 2025

(30) Foreign Application Priority Data

Oct. 13, 2023 (JP) ................................ 2023-177695

(51) Int. Cl.
*B65H 1/26* (2006.01)
*G03G 15/00* (2006.01)

(52) U.S. Cl.
CPC ............ *B65H 1/26* (2013.01); *G03G 15/605* (2013.01); *B65H 2511/18* (2013.01); *B65H 2801/06* (2013.01)

(58) Field of Classification Search
CPC .. B65H 1/26; B65H 2511/18; B65H 2801/06; G03G 15/605
See application file for complete search history.

(56) References Cited

U.S. PATENT DOCUMENTS 5,344,134 A 9/1994 Saeki et al.
5,941,519 A 8/1999 Imoto et al.
(Continued)

FOREIGN PATENT DOCUMENTS

CN 106331408 B 2/2019
JP S61-015244 U 1/1986
(Continued)

OTHER PUBLICATIONS

Extended European Search Report dated Feb. 13, 2025 issued in corresponding European Patent Appln. No. 24195695.2.

*Primary Examiner* — David H Banh
(74) *Attorney, Agent, or Firm* — Harness, Dickey & Pierce, P.L.C.

(57) ABSTRACT

A sheet feeder includes a sheet placement unit to place a sheet, and an indicator indicating a predetermined position at which the sheet is to be set on the sheet placement unit. The indicator is movable between a first position at which the indicator is adjacent to or in contact with the sheet on the sheet placement unit and a second position farther than the first position from the sheet placement unit.

15 Claims, 13 Drawing Sheets

(56) References Cited

U.S. PATENT DOCUMENTS

| | | | |
|---|---|---|---|
| 5,971,388 | A | 10/1999 | Hattori et al. |
| 6,091,927 | A | 7/2000 | Hattori et al. |
| 2003/0170041 | A1 | 9/2003 | Katsuyama |
| 2004/0004319 | A1 | 1/2004 | Hattori et al. |
| 2007/0264063 | A1 | 11/2007 | Sano et al. |
| 2008/0179809 | A1 | 7/2008 | Kikkawa et al. |
| 2009/0194927 | A1* | 8/2009 | Mandel ................ B41J 13/0009 271/4.02 |
| 2011/0062651 | A1* | 3/2011 | Higaki ..................... B65H 3/18 271/226 |
| 2012/0104676 | A1 | 5/2012 | Hatayama et al. |
| 2013/0242359 | A1 | 9/2013 | Heishi et al. |
| 2013/0259507 | A1* | 10/2013 | Cao .................... G03G 15/2042 399/69 |
| 2013/0315610 | A1 | 11/2013 | Utagawa et al. |
| 2013/0320611 | A1 | 12/2013 | Kubo et al. |
| 2014/0125007 | A1 | 5/2014 | Sakano et al. |
| 2016/0342124 | A1* | 11/2016 | Iwadate ............. G03G 15/6508 |
| 2017/0001821 | A1* | 1/2017 | Sato .......................... G06T 7/70 |
| 2020/0379382 | A1* | 12/2020 | Takeuchi ........... G03G 15/2039 |
| 2023/0067412 | A1* | 3/2023 | Nakata ..................... B65H 1/04 |

FOREIGN PATENT DOCUMENTS

| | | | |
|---|---|---|---|
| JP | H06-144594 | A | 5/1994 |
| JP | 2021182683 | A | 11/2021 |

* cited by examiner

COMPARATIVE EXAMPLE

DISPLACEMENT (A) > DISPLACEMENT (a)

COMPARATIVE EXAMPLE

SHEET FEEDER, IMAGE READING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-177695, filed on Oct. 13, 2023, in the Japan Patent Office, the entire disclosure of which is hereby incorporated by reference herein.

BACKGROUND

Technical Field

Embodiments of the present disclosure relate to a sheet feeder, an image reading device, and an image forming apparatus.

Related Art

In the related art, an indicator including an indication part that functions as an index for setting a sheet at a predetermined position of a sheet placement unit is known.

In an image reading device including the indicator as described above, the indicator is disposed on an upper cover that covers a conveying path and a conveying roller of the image reading device disposed above the sheet placement unit. Specifically, the upper cover has an opening on one side to receive a sheet placed on the sheet placement unit of a document reading device. The indicator is disposed at an end of the side to receive the sheet in the upper cover. The indicator has a mark as an indication part that indicates a set position of the center of a document in the width direction. When a document bundle including multiple documents having different widths (referred to as a mixed document bundle below) is set on the sheet placement unit, a small-size document of the mixed document bundle, of which the position is not restricted by side fences in the width direction, is set such that the center of the small-size document in the width direction matches the mark of the indicator.

SUMMARY

According to an embodiment of the present disclosure, a sheet feeder includes a sheet placement unit to place a sheet, and an indicator indicating a predetermined position at which the sheet is to be set on the sheet placement unit. The indicator is movable between a first position at which the indicator is adjacent to or in contact with the sheet on the sheet placement unit and a second position farther than the first position from the sheet placement unit.

According to an embodiment of the present disclosure, a sheet feeder further includes a sheet feeding part to feed the sheet on the sheet placement unit. The indicator indicates the predetermined position of the sheet on the sheet placement unit in a width direction of the sheet.

According to an embodiment of the present disclosure, an image reading device includes the sheet feeder to feed a document sheet and an image reading unit to read an image on the document sheet fed from the sheet feeder.

According to an embodiment of the present disclosure, an image forming apparatus includes the sheet feeder to feed the sheet, and an image forming unit to form an image on the sheet fed from the sheet feeder.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
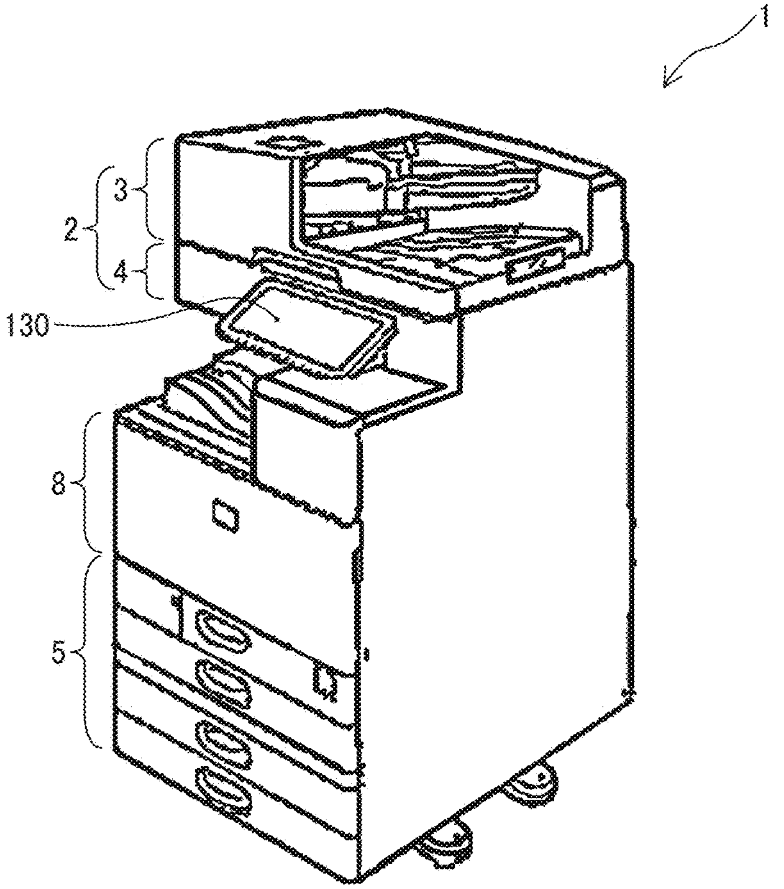
FIG. 1 is a perspective view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to embodiments of the present disclosure, a resin molded article and a determining method for the deterioration of the resin molded article in a simple manner can be provided.

Embodiments of the present disclosure are described in detail with reference to the drawings. In the drawings, the same or like reference signs denote like elements having substantially the same or corresponding configurations, and descriptions thereof may be omitted.

According to embodiments of the present disclosure, the sheet can be set with high accuracy.

Embodiments of the present disclosure will be described with reference to the drawings. It is easy for a person skilled in the art to make other embodiments by changing and modifying the embodiments of the present disclosure within the scope of the claims, and these changes and modifications are included in the scope of the claims. In the following description, the embodiments of the present disclosure are examples of the best mode of the disclosure and are not intended to limit the scope of the claims. FIG. 1 is a perspective view of an image forming apparatus 1 according to an embodiment of the present disclosure. The image forming apparatus 1 illustrated in FIG. 1 has functions of a copying machine, a printer, a facsimile machine, and a scanner, and can record a full-color image or a monochrome image on a recording sheet based on input data such as read image data to output, or output the image in a predetermined data format.

The image forming apparatus 1 includes a sheet feeding unit 5, an image forming unit 8, and an image reading device 2. The image reading device 2 includes a scanner 4 and an automatic document feeder (ADF) 3.

The sheet feeding unit 5 includes multiple sheet feeding cassettes for storing cut recording sheets, and multiple pairs of sheet feeding rollers that pick up and feed a recording sheet from any of the sheet feeding cassettes. The sheet feeding unit 5 has a sheet feeding path including various rollers that convey the recording sheet fed from any of the sheet feeding rollers to a predetermined position for image forming in the image forming unit 8.

The image forming unit 8 includes, for example, an exposure unit, multiple photoconductive drums, a developing device using four color toners of cyan (C), magenta (M), yellow (Y), and black (K), an intermediate transfer unit, a secondary transfer unit, and a fixing unit.

For example, the image forming unit 8 forms an electrostatic latent image on each of the photoconductive drums by exposing the photoconductive drums of the respective colors to light in the exposure unit based on the image read by the image reading device 2, and develops the electrostatic latent image on each of the photoconductive drums by supplying toner to the electrostatic latent image in the developing unit of the developing device. The image forming unit 8 primarily transfers the toner images on the photoconductive drums of the respective colors to the intermediate transfer belt of the intermediate transfer unit, and secondarily transfers the toner images on the recording sheet in an overlapped manner in the secondary transfer unit. The toner image secondarily transferred on the recording sheet is heated and pressed by the fixing unit to be fixed, and a color image is obtained. Further, the image forming unit 8 can form an external output image such as an image file or data that can be output to the outside, based on an image read by the scanner 4 or a second image reading unit as described below. Instead of the image forming unit 8 of the electrophotographic system as described above, an image forming unit employing another recording system such as an inkjet system may be used.

Figure 2:
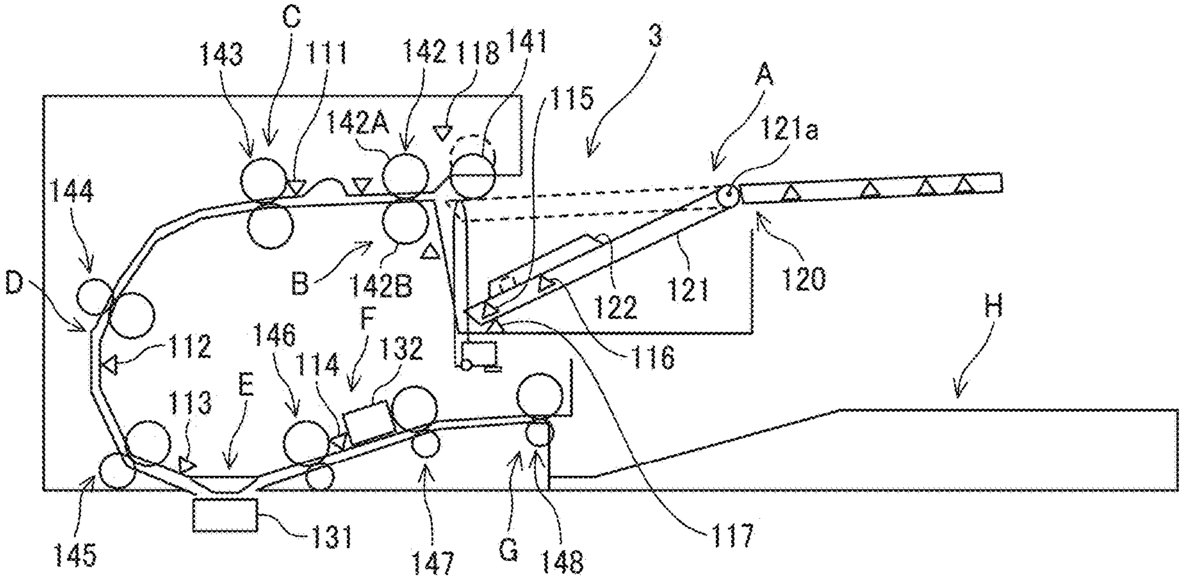
FIG. 2 is a schematic diagram illustrating a configuration of an automatic document feeder.

The ADF 3 will be described below. FIG. 2 is a schematic diagram illustrating a configuration of the ADF 3. The ADF 3 includes a document setting section A on which a document bundle is set, a separating-and-feeding section B that separates a document from the document bundle and feeds the document sheet by sheet, and a registration section C that aligns the fed document sheet by primary abutting and pulls out the aligned document sheet to feed. The ADF 3 further includes a turn section D that turns the document conveyed and conveys the document such that the surface of the document faces the reading side (lower side in the drawing) of the first image reading unit 131. The ADF 3 further includes a first reading-and-conveying section E that reads the front surface image of the document below the contact glass of the scanner 4 by the first image reading unit 131, and a second reading-and-conveying section F that reads the back surface image of the document after the front surface image has been read by the second image reading unit 132. The ADF 3 further includes a sheet ejection section G that ejects the document of which the images on the front and back surfaces have been read to the outside of the image reading device, and a stack unit H that stacks and holds the ejected document.

A single document or two or more documents (collectively referred to as a "document bundle") to be read are set to the document setting section A. The document bundle is set on a document table 120 as a sheet placement unit including a movable table 121.

The ADF 3 is disposed adjacent to the contact glass of the scanner 4. The ADF 3 is openable and closable so as to open and close the contact glass through a hinge.

Figure 3:
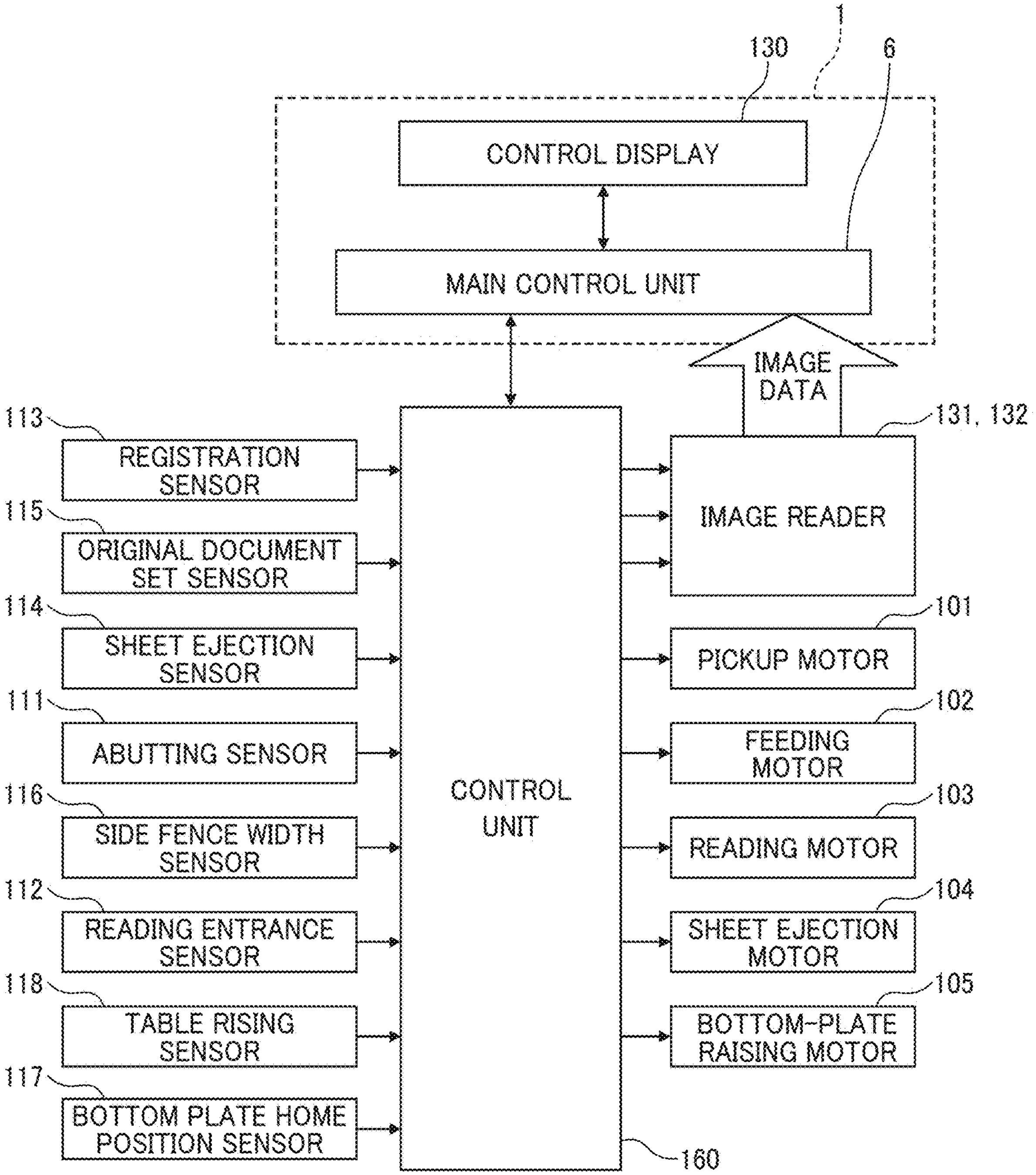
FIG. 3 is a block diagram illustrating a configuration of a control unit of an automatic document feeder.

FIG. 3 is a block diagram illustrating a configuration of a control unit of the ADF 3. As illustrated in FIG. 3, the ADF 3 includes components including a pickup motor 101, a feeding motor 102, a reading motor 103, a sheet ejecting motor 104, and a bottom-plate raising motor 105 that feed and convey the document (document conveying operation) in the document setting section A, the separating-and-feeding section B, the registration section C, the turn section D, the first reading-and-conveying section E, the second reading-and-conveying section F, and sheet ejection section G, and a control unit 160 (circuitry) including circuits that controls various operations including the operations of the pickup motor 101, the feeding motor 102, the reading motor 103, the sheet ejecting motor 104, and the bottom-plate raising motor 105.

The control unit 160 supplies power to the components of the ADF 3 and controls the components of the ADF 3 based on control signals transmitted from the main control unit 6 disposed in the main body of the image forming apparatus 1.

When the image of the document is read, the document bundle is set on the document table 120 (sheet placement unit) including the movable table 121 with the surface of the document (first surface) facing upward. In addition, the width direction of the document bundle (the direction perpendicular to the document conveying direction) is restricted by side fences 122 as a restricting unit, and the side fences 122 are positioned (aligned) according to the width of the document bundle. A document set sensor 115 is disposed on the movable table 121 and detects the setting (setting state) of the document bundle, and the detection is transmitted to the main control unit 6 via an interface (I/F).

The movable table 121 is supported such that the rear end (the rear side in the document feeding direction) of the movable table 121 is rotatable around a rotation shaft 121*a*. The movable table 121 rotates around the rotation shaft 121*a* by the bottom-plate raising motor 105, and the front end (the front side in the document feeding direction) of the movable table 121 can rise and descend.

Before the document is placed on the document table 120, the movable table 121 of the document table 120 is positioned at the home position (descent position). When the movable table 121 is at the home position, a document bundle is placed on the document table 120 by a user. At this time, the uppermost surface of the document bundle on the movable table 121 at the home position is separated from the pickup roller 141 (separated state).

When the document set sensor 115 detects that a document is set, the control unit 160 rotates the bottom-plate raising motor 105 in the forward direction to raise the movable table 121. When the movable table 121 rises and the pickup roller 141 as a feeding unit is pushed up by the upper surface of the document bundle on the movable table 121, and the table rising sensor 118 detects the pushed pickup roller 141 to generate a detection signal. The control unit 160 that has received the detection signal stops the driving of the bottom-plate raising motor 105, so that the movable table 121 is stopped at an appropriate position.

In other words, the table rising sensor 118 is a sensor for detecting that the movable table 121 has reached the appropriate position and for holding the upper surface of the document bundle at an appropriate feeding height. Specifically, when the table rising sensor 118 is turned on, the movable table 121 stops rising. When the document feeding is repeated, the upper surface position of the document bundle is lowered, and the table rising sensor 118 is turned off, the movable table 121 rises again. When the table rising sensor 118 is turned on again, the movable table 121 stops rising. The control operations described above are repeated, and the upper surface position of the document bundle (the height of the uppermost document) is maintained within a height range suitable for document feeding.

Instead of the movable table 121, the pickup roller may rise and descend with the table fixed. The lowermost surface of the document bundle on the table on which the document is set may be fed by the feeding unit. In this case, a pickup roller to rise and descend is disposed below the fixed table, and the pickup roller enters an opening or a notch of the table from below and is brought into contact with the lowermost surface of the document bundle above the table.

Alternatively, the table and the pickup roller protruding from the table may rise together from the lowermost surface of the document bundle, and the lowermost surface of the document bundle on the table set such that the uppermost surface of the document bundle abuts against an upper surface restricting member may be fed by the feeding unit. Further, the table and the pickup roller protruding from the table may not rise and descend, but the upper surface restricting member may descend so as to abut against the uppermost surface of the document bundle, and the lowermost surface of the document bundle may be fed by the feeding unit. In this case, the state in which the pickup roller and the document are in contact with each other is a state in which the uppermost surface of the document bundle is in contact with the upper surface restricting member and the pickup roller has a contact pressure to such an extent that the document can be appropriately fed. The separated state is a state of small contact pressure to such an extent that the uppermost surface of the document bundle does not abut against the upper surface restricting member and the pickup roller cannot appropriately feed the document due to slipping.

When all documents of the document bundle set on the document table 120 are fed, the document set sensor 115 is turned off. When the document set sensor 115 is turned off, the control unit 160 rotates the bottom-plate raising motor 105 in the reverse direction to lower the movable table 121 to the home position such that the following document bundle can be set on the document table 120. In the present embodiment, a bottom-plate home position sensor 117 is disposed to detect that the movable table 121 is at the home position, and the control unit 160 can check whether the movable table 121 is at the home position.

When an instruction of a document reading operation (feeding start instruction) is performed to an operation display 130 in a state in which the uppermost surface of the document bundle on the movable table 121 and the pickup roller 141 are in contact with each other, a document feeding signal (feeding start signal) is transmitted from the main control unit 6 to the control unit 160 through the interface. Accordingly, the feeding operation is started, and the pickup roller 141 is rotated by the forward rotation of the feeding motor 102 in a state in which the upper surface of the document bundle on the movable table 121 is maintained at an appropriate feeding height, and several sheets (ideally a single sheet) of the document bundle on the document table 120 are picked up. The rotation direction at this time is a direction in which the uppermost document is conveyed forward in the feeding direction.

The separation roller pair 142 includes a feed roller 142A and a reverse roller 142B facing the feed roller 142A. The feed roller 142A is rotated in the feeding direction by the forward rotation of the feeding motor 102, and the reverse roller 142B is rotated in the direction opposite to the feeding direction by the forward rotation of the feeding motor 102.

The document separated as a single sheet by the separation roller pair 142 is further conveyed by the feed roller 142A, and after the leading edge of the document is detected by an abutting sensor 111, the document further moves and abuts against the pull-out roller pair 143 that are stopped. The document is conveyed by a predetermined distance from the detection timing of the abutting sensor 111, and the leading edge of the document is pressed against the pull-out roller pair 143 with a predetermined amount of deflection. In this state, the feeding motor 102 is stopped, and the driving of the feed roller 142A that is conveying the document is stopped.

When the leading edge of the document is detected by the abutting sensor 111, the control unit 160 rotates the pickup motor 101 to retract the pickup roller 141 from the upper surface of the document. Thus, the document is conveyed only by the conveying force of the feed roller 142A of the separation roller pair 142. According to such an operation described above, the leading edge of the document enters the nip portion of the pull-out roller pair 143, and alignment (skew correction) of the leading edge is performed. The pull-out roller pair 143 has a function of the skew correction and is driven by the reverse rotation of the feeding motor 102 to convey the document that has been separated and subjected to skew correction to the intermediate roller 144. When the feeding motor 102 is rotated in the reverse direction, the pull-out roller pair 143 and the intermediate roller 144 are driven, but the pickup roller 141 and the feed roller 142A are not driven.

The length of the document in the conveying direction is detected from the motor pulse by detecting the leading edge and the trailing edge of the document with the abutting sensor 111. The document is conveyed from the registration section C to the turn section D by driving the pull-out roller pair 143 and the intermediate roller 144. At this time, the conveyance speed in the registration section C is set to be higher than the conveyance speed in the first reading conveyance section E. Accordingly, the processing time for feeding the document to the first reading-and-conveying section E can be shorten. When the leading edge of the document is detected by the reading entrance sensor 112, the deceleration is started before the leading edge of the document enters the nip portion of the reading entrance roller pair 145 in order to cause the document conveying speed to be equal to the reading conveying speed. At the same time, the reading motor 103 is driven in the forward direction to drive the reading entrance roller pair 145, the first reading exit roller 146, and the second reading exit roller 147.

When the leading edge of the document is detected by the registration sensor 113, the control unit 160 temporarily stops the document upstream from the first reading-and-conveying section E in the conveying direction and transmits a temporal stop signal to the main control unit 6 through the interface. When the control unit 160 receives a reading start signal from the main control unit 6, the control unit 160 increases the speed of conveyance of the document such that the leading edge of the document, which has been temporarily stopped, reaches a predetermined conveyance speed before reaching the first reading-and-conveying section E. The control unit 160 transmits a gate signal indicating an effective image area of the first surface in the sub-scanning direction to the first image reading unit 131 at a timing when the leading edge of the document detected by the pulse count of the reading motor 103 reaches the first reading-and-conveying section E. The gate signal is transmitted until the trailing edge of the document passes through the first reading-and-conveying section E.

In the case of single-side reading, the document that has passed through the first reading-and-conveying section E is conveyed to the sheet ejection section G through the second reading-and-conveying section F. At this time, when the sheet ejection sensor 114 detects the leading edge of the document, the control unit 160 drives the sheet ejection motor 104 to rotate in the forward direction to rotate the sheet ejection roller pair 148. The control unit 160 counts the number of pulse of the sheet ejection motor 104 after the leading edge of the document is detected by the sheet ejection sensor 114. The driving speed of the sheet ejection motor 104 is reduced just before the trailing edge of the document is pulled out from the nip portion of the ejection roller pair 148, and the control is performed such that the document ejected onto the ejection tray of the stack section H does not jump out.

In the case of double-sided reading, the control unit 160 counts the number of pulse of the reading motor 103 after the leading edge of the document that has passed through the first reading-and-conveying section E is detected by the sheet ejection sensor 114. The control unit 160 transmits a gate signal indicating an effective image area in the sub-scanning direction to the second image reading unit 132 at a timing when the leading edge of the document reaches the second reading-and-conveying section F. The gate signal is transmitted until the trailing edge of the document is passed through the second reading-and-conveying section F. The document that has passed through the second reading-and-conveying section E is conveyed to the sheet ejection section G.

There is a case where a document bundle including multiple documents having different document widths (referred to as a mixed document bundle) is set on the document table 120. At this time, the document having the maximum width in the mixed document bundle is restricted by the side fences 122 in the width direction and can be set at a predetermined position in the width direction. Specifically, the document can be set such that the center of the document in the width direction coincides with the center of the conveying path in the width direction (referred to as a conveying reference position).

However, a document other than the document having the maximum width cannot be set at the conveying reference position by the side fences 122. Thus, it is difficult to align the center of the document in the width direction with the conveying reference position for a document other than the document having the maximum width.

Further, since a document other than the document having the maximum width is fed without being restricted in the width direction by the side fences 122, the orientation of the document is not stable and skew is likely to occur. In particular, in terms of a small-size, thin and light weight document, the orientation is not stable and skew is likely to occur.

Accordingly, in the present embodiment, the indication-and-press unit that presses the mixed document bundle placed on the document table 120 and indicates the set position of the document in the width direction is disposed.

Figure 4:
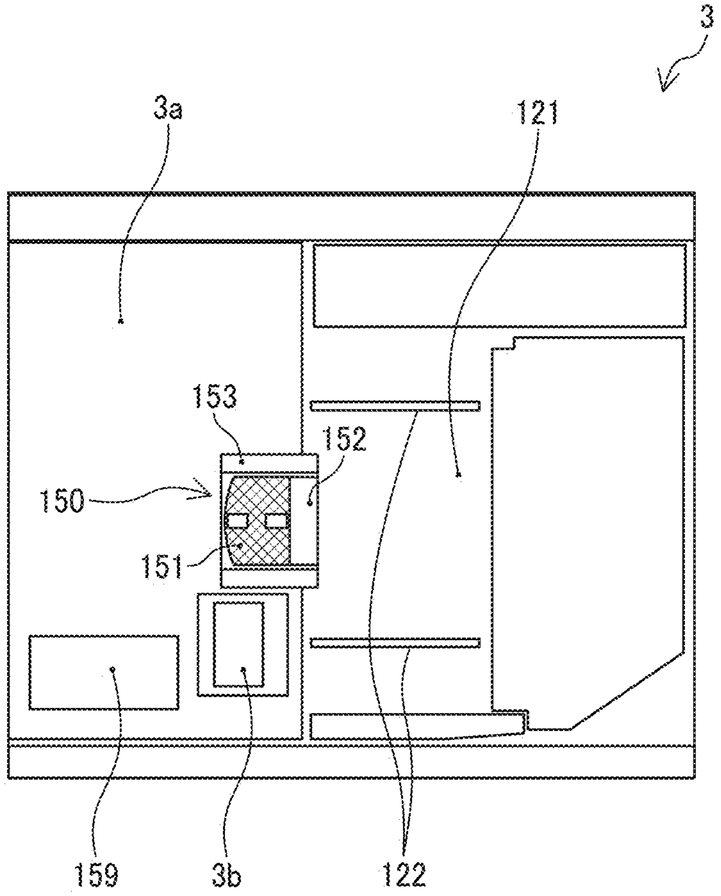
FIG. 4 is a schematic plan view of an automatic document feeder according to an embodiment of the present disclosure.

FIG. 4 is a schematic plan view of the ADF 3 according to an embodiment of the present disclosure. In FIG. 4, the indication-and-press unit 150 is not used. The indication-and-press unit 150 is disposed on the upstream end of the upper surface of the sheet feed cover 3*a* of the ADF 3 in the document conveying direction and at the center in the width direction of the upper surface. An operating lever 3*b* for opening the sheet feed cover 3*a* is disposed closer to the front side of the image forming apparatus 1 than the indication-and-press unit 150. Accordingly, the indication-and-press unit 150 does not interfere with the operating lever 3*b*, and the operating lever 3*b* can be operated.

Figure 5:
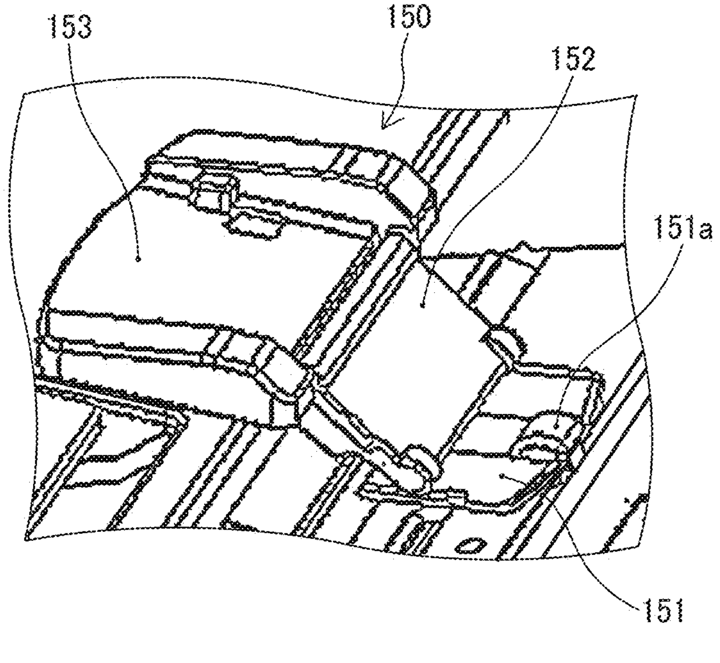
FIG. 5 is a perspective view of an indication-and-press unit.

FIG. 5 is a perspective view of the indication-and-press unit 150. In FIG. 5, the indication plate 151 of the indication-and-press unit 150 is used. As illustrated in FIG. 5, the indication-and-press unit 150 includes an indication plate 151 as an indicator, an arm part 152, and a storage part 153. The arm part 152 rotatably supports the indication plate 151 and is rotatably supported by the storage part 153.

In the present embodiment, the movable table 121 of the document table 120 has different inclination angles when the document is set and when the document is fed. The indication plate 151 is rotatably supported with the arm part 152, and the indication plate 151 can follow the change in the inclination angle of the movable table 121. Further, since the indication plate 151 is rotatably supported with the arm part 152, the indication plate 151 can be stored in the storage part 153 so as to be folded over the arm part 152 as described later. Accordingly, the indication-and-press unit 150 at the time when the indication plate 151 is not used can be reduced in size.

As described later, the indication plate 151 includes pressing rollers 154*a* and 154*b* as press parts (see FIG. 7) rotatably supported at a center position in the width direction. The indication plate 151 according to the present embodiment includes a cover 151*a* (convex cover) covering the pressing roller 154*a* as press part rotatably supported at the upstream end in the document conveying direction. In the present embodiment, the cover 151*a* (convex cover) functions as an indication part for aligning the center of the document in the width direction with the conveying reference position.

Figure 6A:
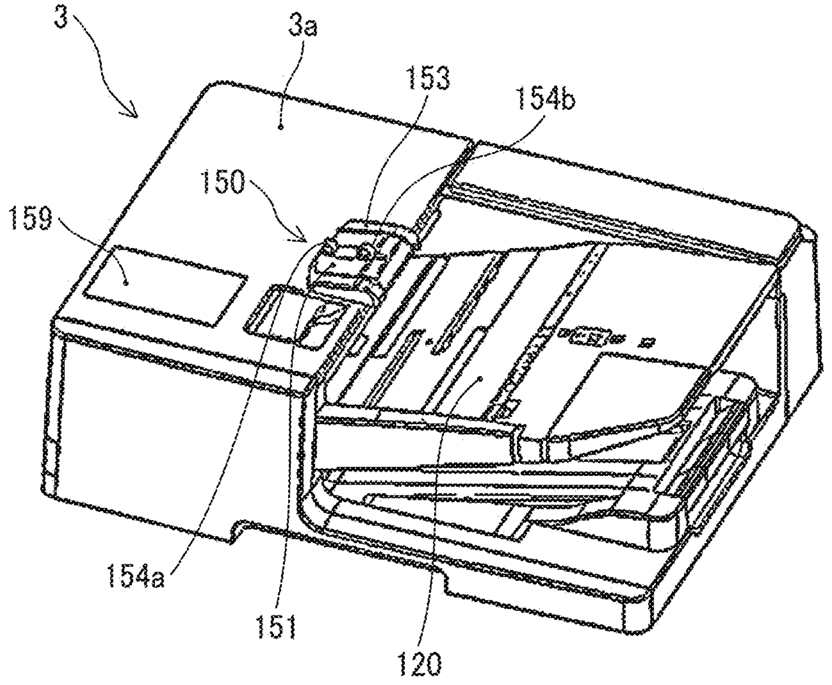
FIG. 6A is a perspective view of an automatic document feeder when an indication plate is not used.

As illustrated in FIG. 6A, when the indication plate 151 is not used, the arm part 152 and the indication plate 151 are folded over the storage part 153 and stored in the storage part 153. The indication plate 151 is stored in the storage part 153 such that the surface of the indication plate 151 facing the placement surface of the document table 120 is the upper surface when the indication plate 151 is used.

As described above, when the indication plate 151 is not used, the indication plate 151 is positioned at the storage position that is a second position at which the indication plate 151 is retracted from the position adjacent to the document on the document table 120 on the sheet feed cover 3*a*. Thus, the indication plate 151 does not interfere with the setting of the document bundle.

Figure 6B:
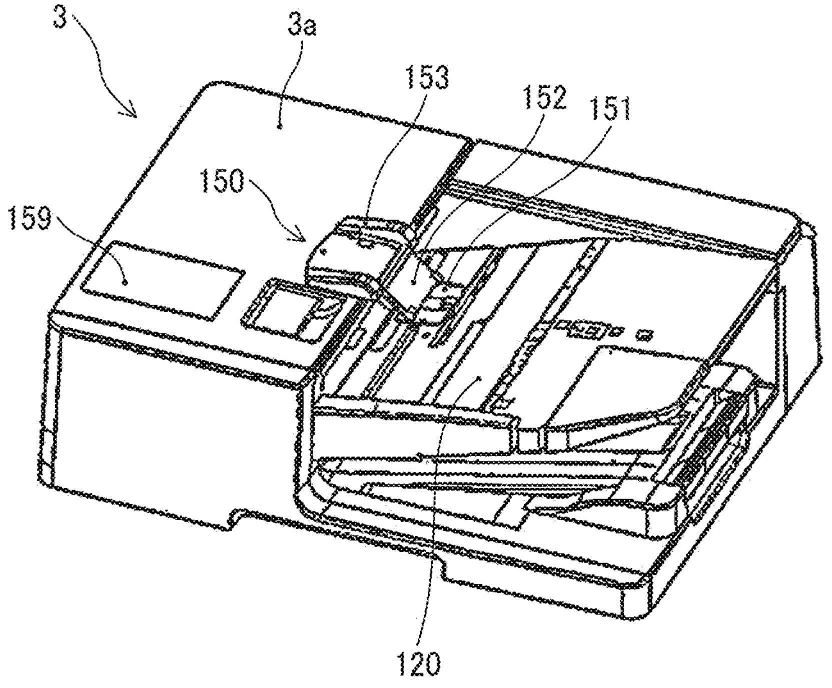
FIG. 6B is a perspective view of the automatic document feeder of FIG. 6A when the indication plate is used.

When the indication plate 151 is used, the indication plate 151 stored in the storage part 153 is lifted and rotated by approximately 180° to be deployed. As illustrated in FIG. 6B, the pressing rollers 154*a* and 154*b* of the indication plate 151 are brought into contact with the placement surface of the document table 120. The indication plate 151 is positioned at the use position that is the first position adjacent to the document on the document table 120.

A display label 159 is attached to the upper surface of the sheet feed cover 3*a* as an instruction that instructs the usage of the indication plate 151. The display label 159 has an instruction to set the indication plate 151 at the use position illustrated in FIG. 6B when the mixed document bundle is set on the document table 120. The display label 159 also has an instruction to set the document such that the center of the indication plate 151 in the width direction is aligned with the center of the document in the width direction using the indication part (i.e., cover 151*a*) of the indication plate 151 as an index. The above-described usage of the indication plate 151 may be described in a user manual, or the usage of the indication plate 151 may be displayed on the screen of the operation display 130 by operating the operation display 130.

Figure 7:
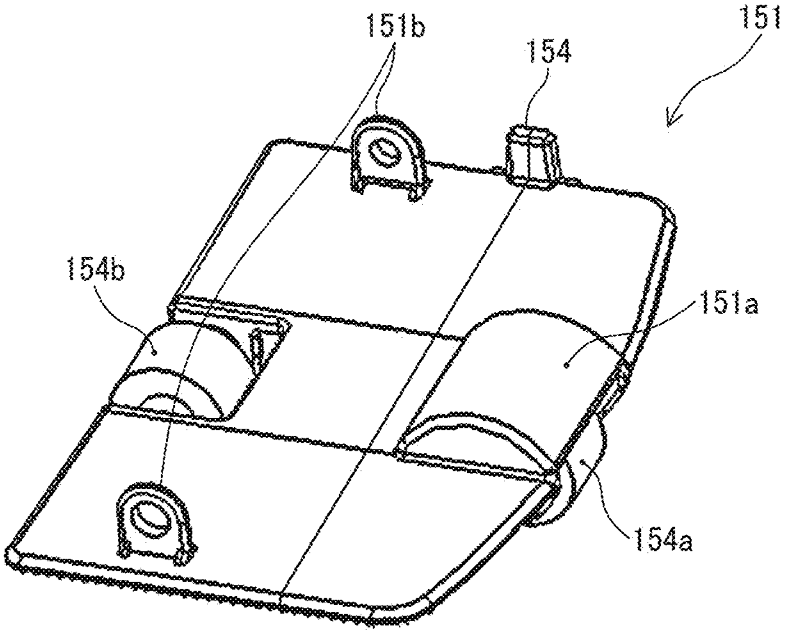
FIG. 7 is a perspective view of an indication plate.

FIG. 7 is a perspective view of the indication plate 151. As illustrated in FIG. 7, two pressing rollers 154*a* and 154*b* are rotatably supported on the indication plate 151 as an indicator with a predetermined gap therebetween in the document conveying direction. The indication plate 151 includes support parts 151*b* rotatably supported by the arm part 152 at both ends in the width direction, and each support part 151*b* has an insertion hole into which the support shaft is inserted. A hook 155 that hooks the indication plate 151 with the storage part 153 is disposed on one end of the indication plate 151 in the width direction (the back side of the image forming apparatus 1).

Figure 8A:
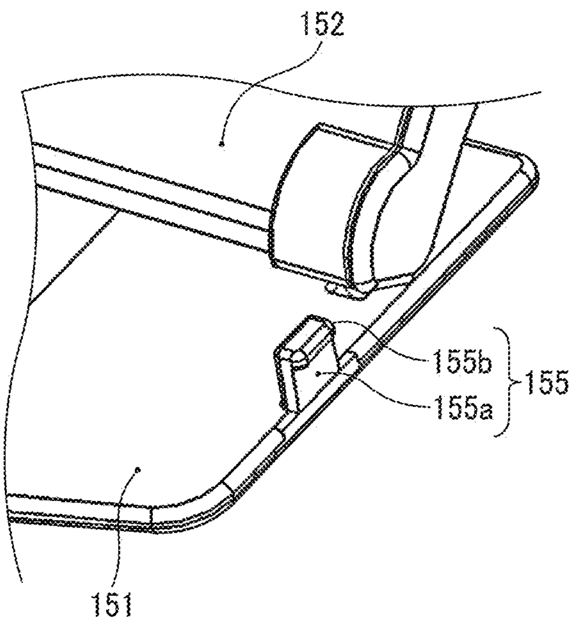
FIG. 8A is an enlarged perspective view of the periphery of a hook part of an indication plate.
Figure 8B:
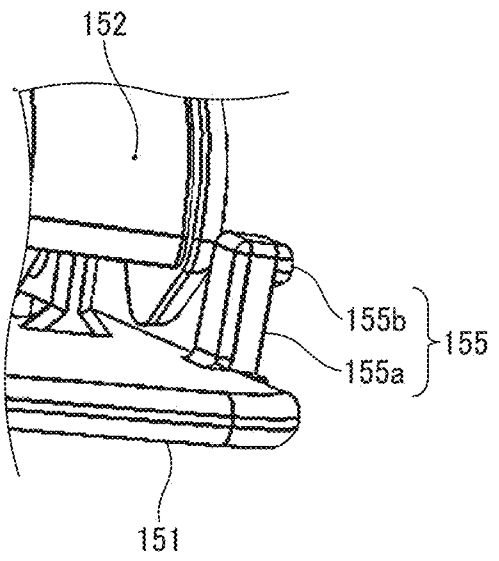
FIG. 8B is an enlarged perspective view of the periphery of the hook part of the indication plate of FIG. 8A.

FIGS. 8A and 8B are enlarged perspective views of the periphery of the hook 155 of the indication plate 151. As illustrated in FIGS. 8A and 8B, the hook 155 includes a leg portion 155*a* and a claw portion 155*b*. The leg portion 155*a* extends perpendicularly from the indication plate 151 and is elastically deformable in the width direction. The claw portion 155*b* is disposed so as to protrude outward from the top of the leg portion 155*a* in the width direction.

Figure 9:
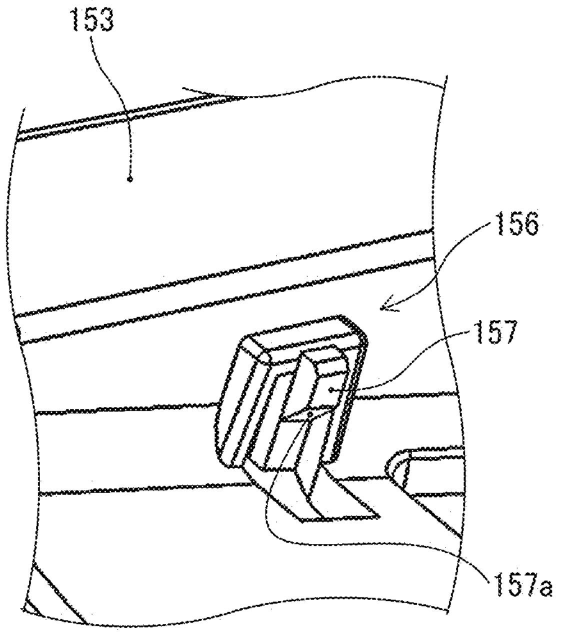
FIG. 9 is an enlarged perspective view of a main body of a storage part.

FIG. 9 is an enlarged perspective view of a main part of the storage part 153. As illustrated in FIG. 9, the storage part 153 includes a holder 156 for holding the indication plate 151 to the storage part 153 at one end of the storage part 153 in the width direction. The holder 156 includes an engaging convex portion 157 with which the claw portion 155*b* of the hook 155 of the indication plate 151 is hooked. The lower surface of the engaging convex portion 157 has an inclined surface (inclined lower surface 157*a*) that is positioned inward in the width direction as it goes upward.

Figure 10:
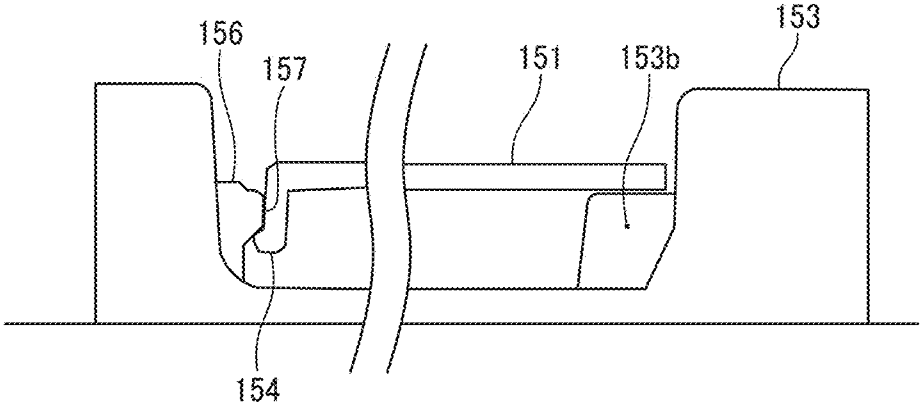
FIG. 10 is a schematic cross-sectional view of an indication plate stored in a storage part.

When the indication plate 151 positioned at the use position illustrated in FIG. 6B is stored in the storage part 153, the claw portion 155*b* of the hook 155 abuts against the engaging convex portion 157 from the vertically upper side. When the indication plate 151 is pushed from this state described above by a user, the leg portion 155*a* of the hook 155 is elastically deformed inward in the width direction, and the claw portion 155*b* climbs over the engaging convex portion 157. When the claw portion 155*b* climbs over the engaging convex portion 157, the leg portion 155*a* returns to the initial shape. As a result, the claw portion 155*b*, as illustrated in FIG. 10, faces the engaging convex portion 157 from below and is hooked with the engaging convex portion 157, and the indication plate 151 is held by the storage part 153. At this time, the side of the indication plate 151 opposite to the hook 155 in the width direction is received by a pedestal receiving portion 153*b* disposed on the storage part 153.

As described above, since the indication plate 151 is held by the hook 155 with the storage part 153, the indication plate 151 can be prevented from jumping out of the storage part 153 when the ADF 3 is rotated through the hinge to open the contact glass of the scanner 4.

When the indication plate 151 is used, the end of the indication plate 151 stored in the storage part 153 at the side opposite to the document table 120 is lifted. The claw portion 155*b* climbs the inclined lower surface 157*a* of the engaging convex portion 157 while the leg portion 155*a* of the hook 155 is elastically deformed. As a result, the engagement between the claw portion 155*b* and the engaging convex portion 157 is released, and the indication plate 151 can be moved to the use position.

Figure 11A:
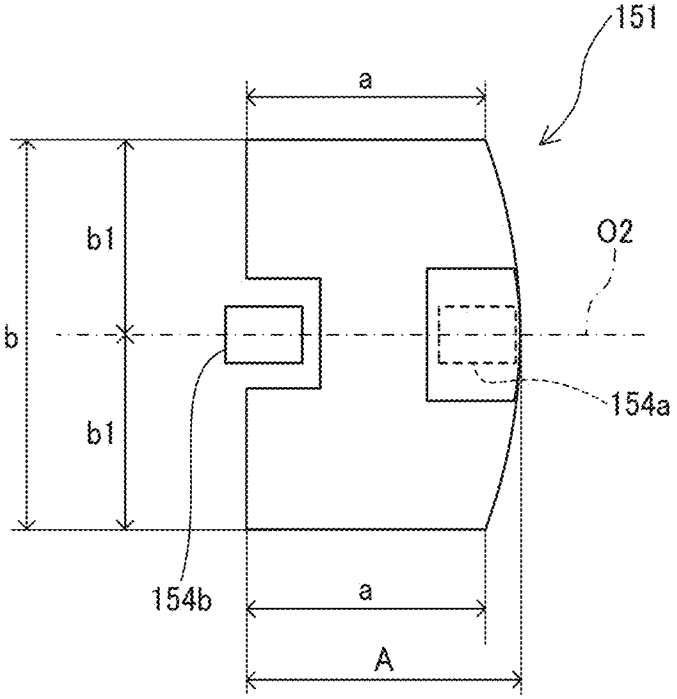
FIG. 11A is a plan view of an indication plate.
Figure 11B:
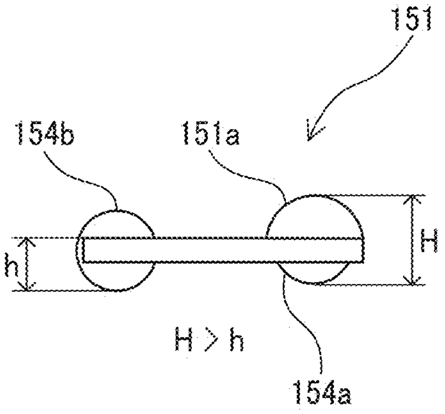
FIG. 11B is a side view of the indication plate of FIG. 11A.

FIG. 11A is a plan view of the indication plate 151, and FIG. 11B is a side view of the indication plate 151. As illustrated in FIG. 11A, the upstream end of the indication plate 151 in the document conveying direction is formed in a substantially arc shape, and the length A of the indication plate 151 in the document conveying direction at the center in the width direction is longer than the length a of the indication plate 151 in the document conveying direction at both ends of in the width direction (A>a). The length of the indication plate 151 in the width direction is equal to or smaller than the minimum width of a sheet that the ADF 3 can be conveyed.

The length of the indication plate 151 from the conveying reference position O2 to one edge and the length of the indication plate 151 from the conveying reference position O2 to the other edge are the same length b1. When the center of the document in the width direction is aligned with the conveying reference position O2, the amount of the document protruding from one edge of the indication plate 151 in the width direction is same as the amount of the document protruding from the other edge of the indication plate 151 in the width direction. Thus, the position of the document in the width direction on the document table 120 is adjusted such that the amount of the document protruding from one edge of the indication plate 151 in the width direction is same as the amount of the document protruding from the other edge of the indication plate 151 in the width direction. Accordingly, the center of the document in the width direction can be aligned with the conveying reference position O2.

As illustrated in FIG. 11B, the indication plate 151 has a height H of the cover 151*a* that covers the pressing roller 154*a* and a height h of a portion other than the cover 151*a*. The height h is lower than the height H (H>h).

Figure 12A:
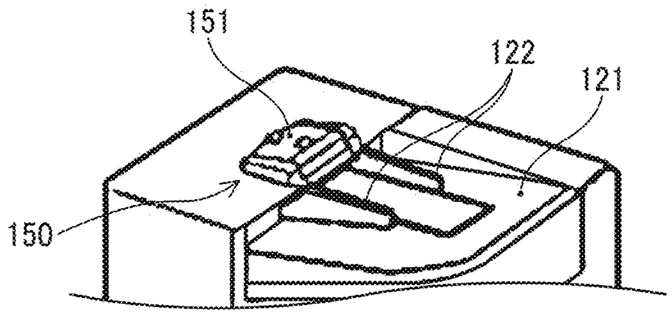
FIG. 12A is a perspective view of an automatic document feeder to which a bundle of documents having the same width is set.

As illustrated in FIG. 12A, when a document bundle having the same width of documents is set, the edges of the document bundle are restricted by the side fences 122. As a result, the center of the document in the width direction can be aligned with the conveying reference position of a predetermined position. Thus, in this case, since the indication plate 151 is not used, the indication plate 151 is stored in the storage part 153 and retracted from the document table 120. Thus, when the document bundle is set on the document table 120, the indication plate 151 does not interfere with the setting of the document bundle. As a result, the document bundle can be easily set on the document table 120.

Figure 12B:
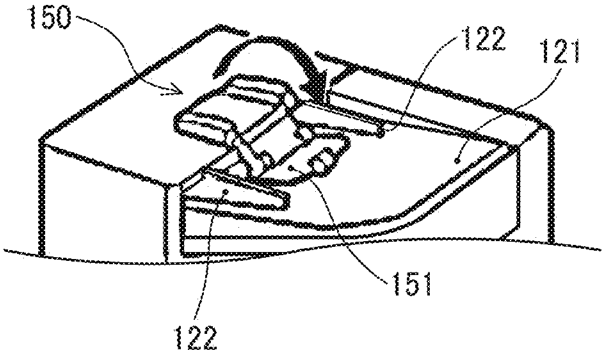
FIG. 12B is a perspective view of the automatic document feeder of FIG. 12A for setting a mixed document bundle.

As illustrated in FIG. 12B, when a mixed document bundle including multiple documents having different widths is set, the indication plate 151 is moved from the storage position at which the indication plate 151 is stored in the storage part 153 to the use position at which the indication plate 151 is adjacent to the document table 120.

As described above, the display label 159 that displays an instruction of how to use the indication plate 151 is attached to the upper surface of the sheet feed cover 3*a*. The indication plate 151 is moved to the use position when the mixed document bundle is set by the user based on the usage displayed on the display label 159.

Figure 12C:
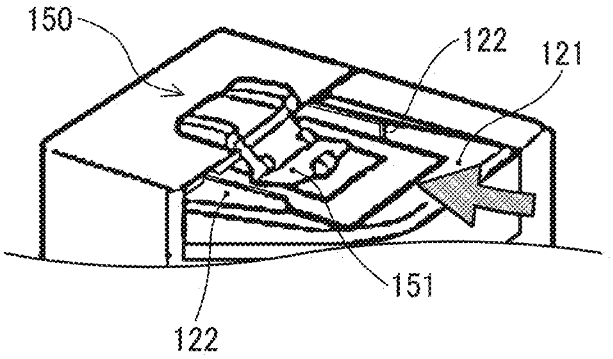
FIG. 12C is a perspective view of the automatic document feeder of FIG. 12B to which the mixed document bundle is set.

As described above, the indication plate 151 is positioned at the use position. As illustrated in FIG. 12C, the document is inserted between the indication plate 151 and the document table 120 from the upstream in the document conveying direction as illustrated by the arrow in FIG. 12C in order from the lowest document in the mixed document bundle At this time, the pressing rollers 154*a* and 154*b* rotatably supported by the indication plate 151 rotate together with the inserted document, and the document can be smoothly inserted between the indication plate 151 and the document table 120.

Figure 13A:
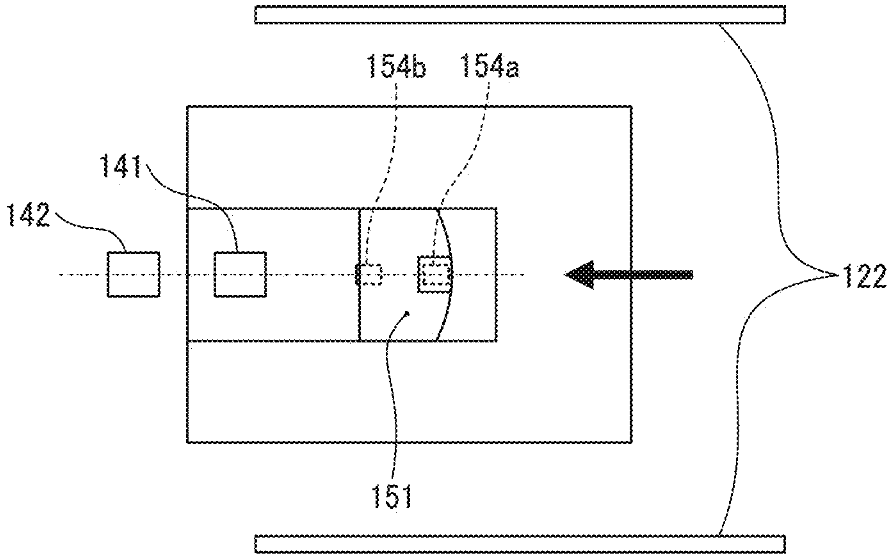
FIG. 13A is a plan view of an automatic document feeder to which a mixed document bundle is set.
Figure 13B:
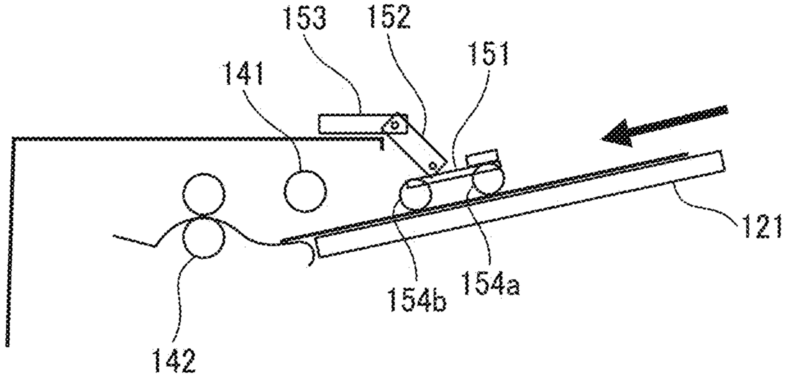
FIG. 13B is a side view of the automated document feeder of FIG. 13A to which the mixed document bundle is set.

FIG. 13A is a plan view of the setting of the mixed document bundle, and FIG. 13B is a side view of the setting of the mixed document bundle. As represented by the arrows in FIGS. 13A and 13B, a document is inserted between the indication plate 151 and the document table 120 from the upstream in the document conveying direction. After the document is inserted, the document is aligned by moving the document in the width direction such that the center of the cover 151*a* as the indication part of the indication plate 151 in the width direction is aligned with the center of the document in the width direction, and the amounts of the document protruding from both ends in the width direction of the indication plate 151 are the same. Accordingly, the center of the document in the width direction can be aligned with the conveying reference position O2. After the document positioning is completed, the following document is inserted between the indication plate 151 and the document table 120 from the upstream in the document conveying direction.

The above-described method of setting the mixed document bundle is also described in the display label 159, and the mixed document bundle can be set by the user according to the method of setting the mixed document bundle described in the display label 159.

After all the documents of the mixed document bundle are inserted between the indication plate 151 and the document table 120, the side fences 122 are moved in the width direction to abut against the edges of the document having the maximum width in the width direction among the documents of the mixed document bundle. Accordingly, the setting of the mixed document bundle is completed. When the setting of the mixed document bundle is completed, the user operates the operation display 130 to start the conveyance of documents in the mixed mode.

When the feeding is started in the mixed mode, the feeding speed in the mixed mode is slower than a feeding speed in the normal mode that is set when a document bundle having the same width of documents as illustrated in FIG. 12A. Documents other than the document having the maximum width in the mixed document bundle are not restricted in the width direction by the side fences. Thus, the documents other than the document having the maximum width on the document table 120 may shift as a document being fed shifts in the width direction, and the orientation of the documents may gradually vary.

When the document is fed at the feeding speed in the normal mode, the kinetic energy is larger, and the document being fed applies a greater force to the documents on the document table 120 before feeding, and the documents on the document table 120 before feeding may shift.

As in the present embodiment, when the feeding speed in the mixed mode is set to be slower than the feeding speed in the normal mode, the force that the document being fed applies to the documents on the document table 120 before feeding can be decreased. Accordingly, the orientation of the documents other than the document having the maximum width on the document table 120 can be prevented from varying, and the occurrence of feeding failure can be prevented.

In addition, a document other than the document having the maximum width in the mixed document bundle is fed without being restricted in the width direction by the side fences 122, and thus skew is likely to occur. However, according to the present embodiment, the document is fed while being pressed by the two pressing rollers 154*a* and 154*b* of the indication plate 151. Accordingly, the document can be prevented from skewing (tilting) while being fed due to the pressing of the pressing rollers 154*a* and 154*b*. The centers of the pressing rollers 154*a* and 154*b* in the width direction are positioned at the conveying reference position O2, and aligned with the pickup roller 141 and the separation roller pair 142 on a straight line in the conveying direction as illustrated in FIG. 13A. Accordingly, the force applied to the documents in the width direction at the time of feeding can be reduced, and the skew is less likely to occur. Further, the pressing rollers 154*a* and 154*b* are rotated as the document is fed, and the document is prevented from being rubbed. As a result, the document can be prevented from being scraped.

Figure 14A:
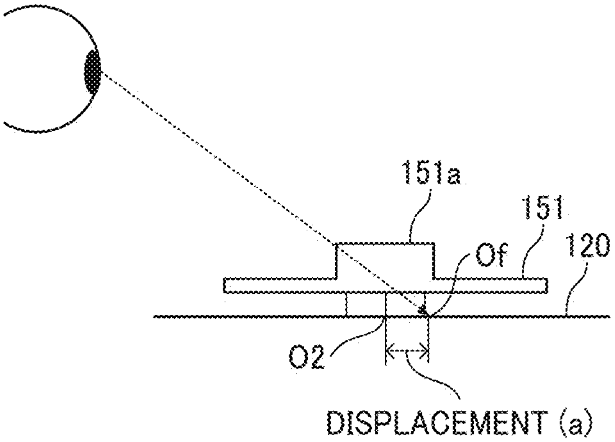
FIG. 14A is a diagram illustrating the amount of displacement between an apparent center of an indication plate on a document table in the width direction and a conveying reference position as viewed from the front side of a image forming apparatus.
Figure 14B:
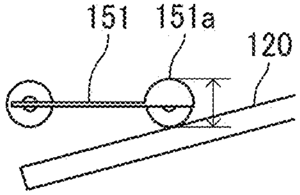
FIG. 14B is a side view of FIG. 14A.
Figure 14C:
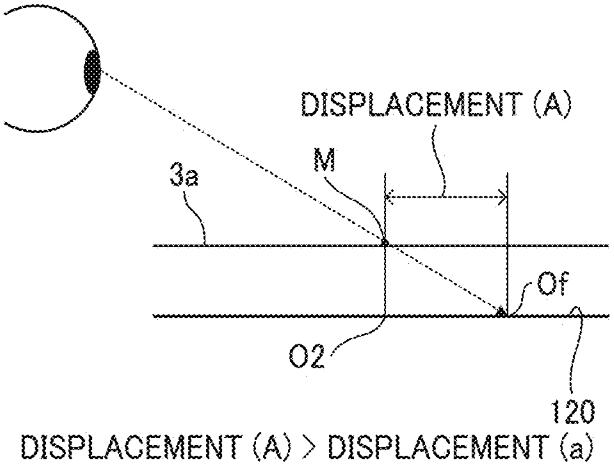
FIG. 14C is a diagram illustrating the amount of displacement between an apparent position of a mark for positional alignment disposed on a sheet feeder cover on the document table and the conveying reference position as viewed from the front side of the image forming apparatus.
Figure 14D:
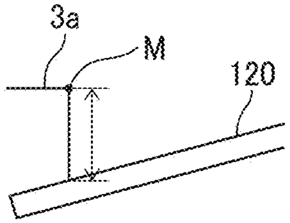
FIG. 14D is a side view of FIG. 14C.

FIG. 14A is a diagram illustrating the amount of displacement between an apparent center of the indication plate 151 in the width direction on the document table 120 and the conveying reference position as viewed from the front side of the image forming apparatus 1 in FIG. 1. FIG. 14B is a side view of FIG. 14A. FIG. 14C is a diagram illustrating the amount of displacement between an apparent position of an alignment mark M, which is disposed on the sheet feed cover 3*a*, on the document table 120 and the conveying reference position as viewed from the front side of the image forming apparatus 1 in FIG. 1. FIG. 14D is a side view of FIG. 14C.

As illustrated in FIGS. 14C and 14D, when the alignment mark M for aligning the center of the document in the width direction with the conveying reference position O2 is disposed on the sheet feed cover 3*a*, the distance between the alignment mark M and the document on the document table 120 is larger. Thus, as viewed from the front side of the image forming apparatus 1 in FIG. 1, the amount of displacement between the apparent conveying reference position Of (a position viewed directly above the alignment mark M of the document table 120) on the document table 120 represented by the alignment mark M and the actual conveying reference position O2 becomes larger. As a result, a document other than the document having the maximum width in the mixed document bundle may be fed in a state in which the center of the document in the width direction is largely displaced from the conveying reference position O2, and the skew is likely to occur.

By contrast, when the indication plate 151 according to the present embodiment is used, the indication plate 151 is placed adjacent to the document table 120 as illustrated in FIGS. 14A and 14B. Accordingly, the distance between the indication plate 151 and the document to be aligned is smaller than the distance in the configuration illustrated FIGS. 14C and 14D. As a result, as illustrated in FIGS. 14A and 14B, as viewed from the front side of the image forming apparatus 1 in FIG. 1, the amount of displacement between the apparent conveying reference position Of on the document table 120 indicated by the center of the cover 151*a* in the width direction as an indication part and the actual conveying reference position O2 can be decreased as compared with the configuration illustrated in FIGS. 14C and 14D. Thus, a document other than the document having the maximum width in the mixed document bundle can be stably fed, and the skew can be prevented.

When the indication plate 151 has a linear edge in the width direction at the upstream end in the document conveying direction, the indication plate 151 has a length A in the document conveying direction at the center in the width direction of the indication plate 151, the length A is same as the length a in the document conveying direction at both edges in the width direction of the indication plate 151, and the leading edge of the document is curled upward, the following problem may occur. In other words, any portion of the leading edge of the document in the width direction is caught by the edge of the indication plate 151 at the upstream end in the document conveying direction. As a result, the leading edge of the document is bent at a point at which the leading edge of the document is caught by the edge of the indication plate 151 at the upstream end in the document conveying direction.

Figure 15:
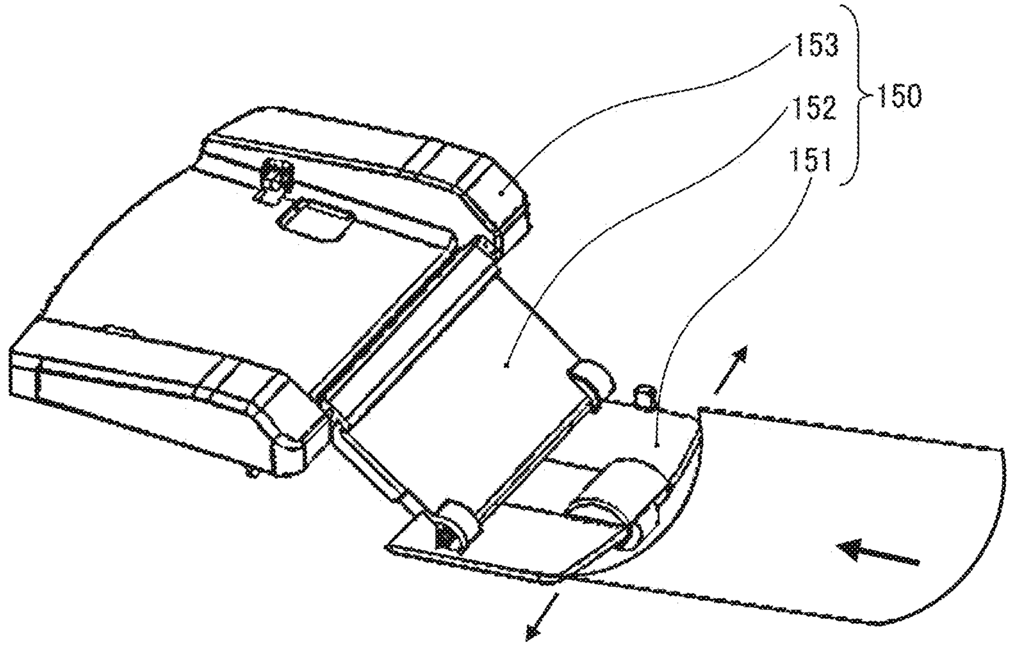
FIG. 15 is a diagram illustrating the way of insertion of a document having the leading edge curled upward between an indication plate and a document table.

By contrast, as illustrated in FIGS. 11A and 11B, the indication plate 151 according to the present embodiment has a shape of an arc at the upstream end in the document conveying direction, and the center of the arc is positioned upstream from both ends of the arc in the document conveying direction. Thus, as illustrated in FIG. 15, when the document having the leading edge curled upward is inserted between the indication plate 151 and the document table 120, first, the center of the document in the width direction is inserted between the document table 120 and the indication plate 151. Then, the leading edge of the document is gradually inserted between the document table 120 and the indication plate 151 from the center of the document in the width direction while the indication plate 151 presses the leading edge of the document (while releasing the curl to the outside in the width direction). Accordingly, the leading edge of the document can be prevented from being caught by the indication plate 151, and the leading edge of the document can be prevented from being bent, as compared with the case where the length A in the document conveying direction at the center of the indication plate 151 in the width direction is same as the length a in the document conveying direction at both ends in the width direction of the indication plate 151.

The indication plate 151 according to the present embodiment has the cover 151*a* covering the pressing roller 154*a* rotatably supported near the upstream edge in the document conveying direction. Accordingly, the leading edge of the document can be prevented from riding on the pressing roller 154*a* when the leading edge of the document is curled upward.

Figure 16:
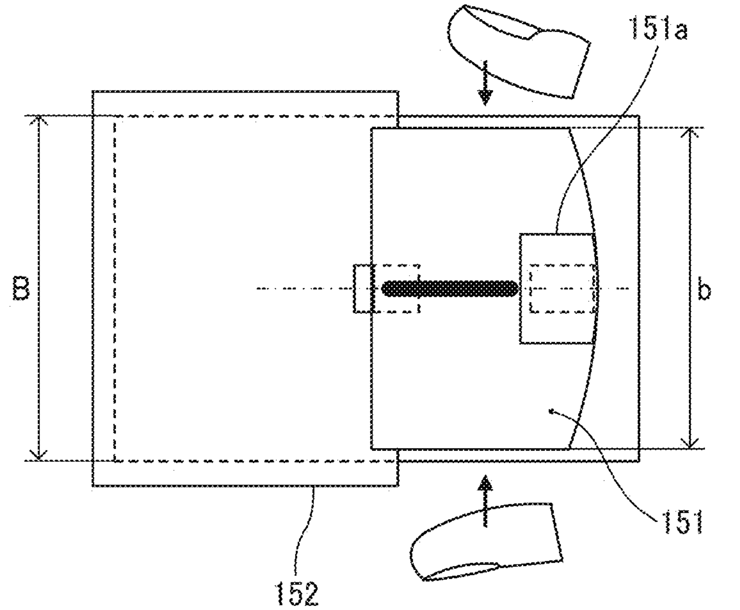
FIG. 16 is a diagram illustrating an operation of setting a document having a minimum width that can be conveyed by an automatic document feeder for a mixed document bundle.

FIG. 16 is a diagram illustrating an operation of setting a document having the minimum width that can be conveyed by the ADF 3 for the mixed document bundle. As described above, the length b of the indication plate 151 in the width direction is equal to or smaller than the minimum width B of the document that can be conveyed by the ADF 3. Thus, as illustrated in FIG. 16, when a document having the minimum width is set, the edges of the document in the width direction are protruded from the indication plate 151. Accordingly, in terms of the document having the minimum width, the alignment of the document in the width direction (the alignment of the center of the document in the width direction with the conveying reference position) can be performed while both portions adjacent to the indication plate 151 in the width direction of the document are pressed with fingers. Accordingly, the document having the minimum width can be easily aligned.

In particular, when the length b of the indication plate 151 in the width direction is set to be the minimum width B, both portions of the document adjacent to the indication plate 151 are pressed with fingers in the width direction to place both edges of the document in the width direction under the indication plate 151. Thus, the center of the document in the width direction can be easily aligned with the conveying reference position with high accuracy.

As the width of the document is narrower, the ratio of the amount of displacement to the document width becomes larger, and skew is more likely to occur, even if the amount of displacement between the center of the document in the width direction and the conveying reference is the same. However, when the length b of the indication plate 151 in the width direction is set to the minimum width B, and the center of the document having the minimum width in the width direction is aligned with the conveying reference position with high accuracy, the skew of the document having the minimum width can be prevented well.

Figure 17A:
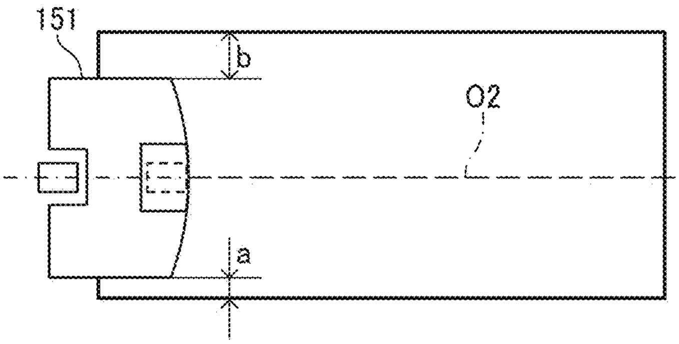
FIG. 17A is a top view of an indication plate with a height lower than the height of a cover.
Figure 17B:
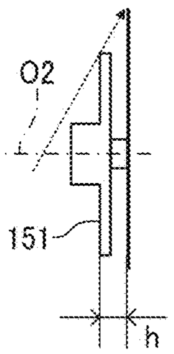
FIG. 17B is a front view of FIG. 17A.
Figure 17C:
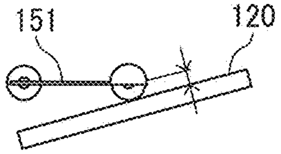
FIG. 17C is a side view of FIG. 17A.
Figure 17D:
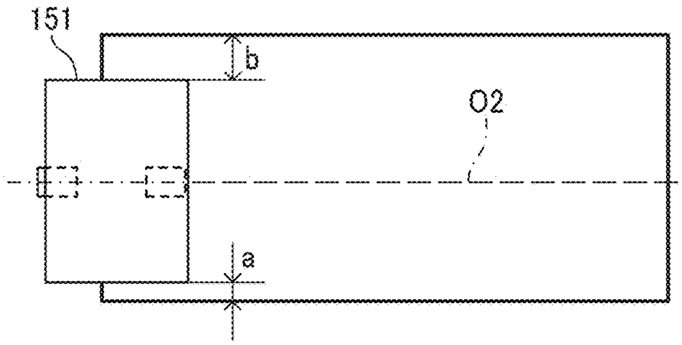
FIG. 17D is a top view of an indication plate with the same height as the height of a cover.
Figure 17E:
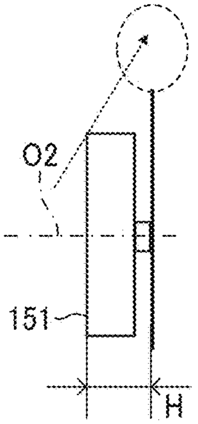
FIG. 17E is a front view of FIG. 17D.
Figure 17F:
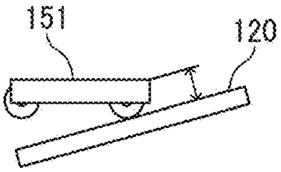
FIG. 17F is a side view of FIG. 17D.

FIGS. 17A to 17C are diagrams illustrating a positional relation of the indication plate 151, the document, and the document table 120. As viewed from the front side of the image forming apparatus 1 in FIG. 1, one edge of the document in the width direction is viewed as illustrated in FIG. 17B. FIGS. 17D to 17F are diagrams illustrating a positional relation of the indication plate 151, the document, and the document table 120. As viewed from the front side of the image forming apparatus 1 in FIG. 1, the one edge of the document in the width direction is not viewed in FIG. 17E. The indication plate 151 has the same height as the height of the cover 151*a* of the indication plate 151.

As illustrated in FIGS. 17E and 17F, when the height of the indication plate 151 is the same as the height H of the cover 151*a*, one edge of the document in the width direction at the back side of the image forming apparatus 1 in FIG. 1 is hidden by the indication plate 151 as viewed from the front side of the image forming apparatus 1. By contrast, in the present embodiment, the height of the indication plate 151 in any area other than the cover 151*a* is lower than the height H of the cover 151*a*. As illustrated in FIGS. 17B and 17C, such a configuration can prevent one edge of the document in the width direction at the back side of the image forming apparatus 1 in FIG. 1 from being hidden by the indication plate 151 as viewed from the front side of the image forming apparatus 1. As described above, when the height of the indication plate 151 in any area other than the cover 151*a* is lower than the height H of the cover 151*a*, the protrusion of the document from the indication plate 151 in the width direction at the back side of the image forming apparatus 1 in FIG. 1 is likely to be viewed from the front side of the image forming apparatus 1. Accordingly, as viewed from the front side of the image forming apparatus 1, the displacement of the center of the document in the width direction from the conveying reference position O2 is more easily recognized than in the configuration illustrated in FIGS. 17D to 17F. Thus, the document can be prevented from being fed in a state where the center of the document in the width direction is displaced from the conveying reference position O2, and the skew can be prevented.

Figure 18A:
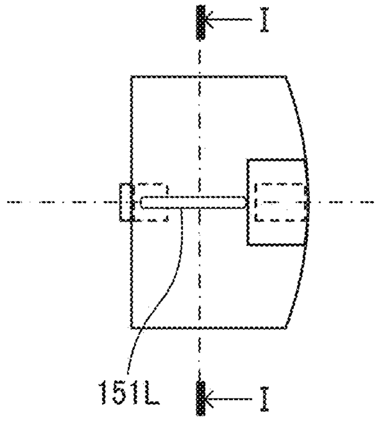
FIG. 18A is a diagram illustrating an indication plate having a straight line extending in a document conveying direction in the center of the indication plate in the width direction.
Figure 18B:
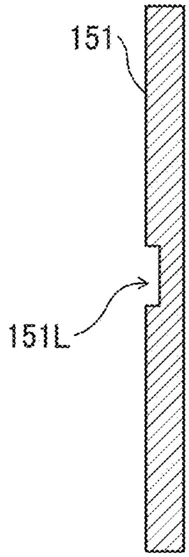
FIG. 18B is a cross-sectional view of an indication plate having a recession.
Figure 18C:
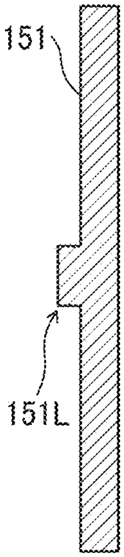
FIG. 18C is a cross-sectional view of an indication plate having a protrusion.
Figure 18D:
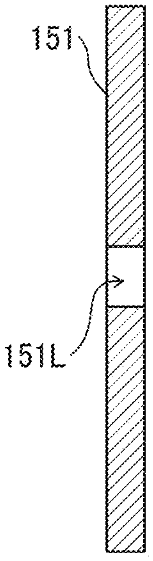
FIG. 18D is a cross-sectional view of an indication plate having an aperture.
Figure 18E:
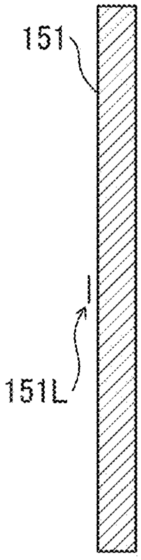
FIG. 18E is a cross-sectional view of an indication plate on which a mark is painted.
Figure 18F:
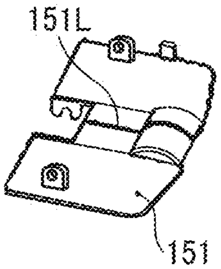
FIG. 18F is a perspective view of the indication plate in FIG. 18B.
Figure 18G:
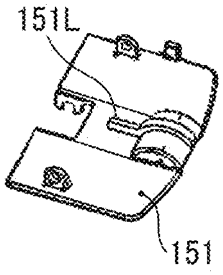
FIG. 18G is a perspective view of the indication plate in FIG. 18C.
Figure 18H:
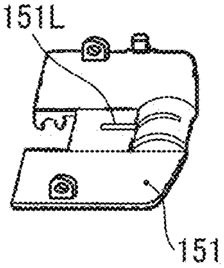
FIG. 18H is a perspective view of the indication plate in FIG. 18D.
Figure 18I:
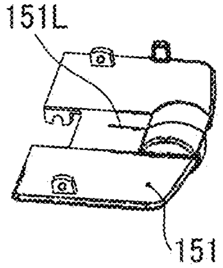
FIG. 18I is a perspective view of the indication plate in FIG. 18E.

In the present embodiment, the cover 151*a* disposed at the center in the width direction of the upstream end in the conveying direction is used as an indication part for aligning the center of the document in the width direction with the conveying reference position O2. However, a mark for aligning the center of the document in the width direction with the center of the indication plate 151 in the width direction may be used. As an example of the mark, a straight line 151L extending in the document conveying direction can be used at the center of the indication plate 151 in the width direction, as illustrated in FIG. 18A. The straight line 151L as the mark may have a recess in the cross-section as illustrated in FIG. 18B, a protrusion in the cross-section as illustrated in FIG. 18C, an aperture as illustrated in FIG. 18D, or may be formed by a painting material as illustrated in FIG. 18E.

As described above, when the mark such as the straight line 151L is disposed at the center of the indication plate 151 in the width direction, the center of the document in the width direction can be easily aligned with the center of the indication plate 151 in the width direction.

Further, a detecting device that detects whether the indication plate 151 is at the storage position is disposed. When the mixed document mode is selected by a user, the detecting device detects whether the indication plate 151 is at the storage position. When the detecting device detects that the indication plate 151 is at the storage position, the operation display 130 may display a warning to set the document with the indication plate 151 at the use position without feeding the document.

According to the present embodiment, the indication plate 151 includes the pressing rollers 154*a* and 154*b*, and the indication plate 151 is positioned adjacent to the document table 120 when the indication plate 151 is positioned at the use position. However, for example, the pressing rollers 154*a* and 154*b* may be eliminated, and the indication plate 151 may be directly brought into contact with the sheet placed on the document table 120. Accordingly, the distance between the indication plate 151 and the sheet placed on the document table 120 can be closer when the indication plate 151 is positioned at the use position. Thus, the displacement between the apparent conveying reference position on the document table 120 indicated by the mark such as the straight line 151L disposed on the indication plate 151 when the indication plate 151 is viewed from the front side of the apparatus and the actual conveying reference position can be further reduced.

As described above, several embodiments of the present disclosure have been described in detail. However, the present disclosure is not limited to the above-described embodiments, and various modifications or changes can be made within the scope of the present disclosure described in the claims below. For example, the present disclosure can be applied to a bypass sheet feeding unit of the image forming apparatus 1. The bypass sheet feeding unit to which the present disclosure is applied can be adopted not only in an image forming apparatus of an electrophotographic system but also in an image forming unit employing another recording system such as an inkjet system.

As described above, aspects and advantageous effect of the present disclosure are, for example, as follows.

First Aspect

An indicator such as the indication plate 151 includes an indication part such as the cover 151*a* as an index indicating a predetermined position at which a sheet is to be set on a sheet placement unit such as the document table 120. The indicator is positioned at a first position such as the use position at which the indicator is adjacent to or in contact with the sheet placed on the sheet placement unit or a second position such as the storage position at which the indicator is retracted from the sheet placement unit. In the related art, the distance between a sheet set on a sheet placement unit and an indicator is larger, and the apparent set position indicated by an indication part such as a mark of the indicator on the sheet placement unit and the predetermined position to be set on the sheet placement unit are displaced largely depending on the angle at which the indicator is viewed. Accordingly, the sheet may not be set at the predetermined position with high accuracy. By contrast, according to the first aspect, the indicator can be positioned at the first position at which the indicator is adjacent to or in contact with the sheet placed on the sheet placement unit. Accordingly, the displacement between the apparent set position indicated by the indication part on the sheet placement unit and the predetermined position to be set on the sheet placement unit due to the angle at which the indicator is viewed is decreased as compared with the case in the related art. As a result, the sheet can be set at a predetermined position with high accuracy as compared with the case in the related art. When all sheets of the sheet bundle placed on the sheet placement unit can be set at a predetermined position by the side fences such as when the sheet bundle (document bundle) including sheets having the same width, the indicator can be positioned at the second position at which the indicator is retracted from the sheet placement unit. Accordingly, the indicator does not interfere with the setting of the sheet bundle to the sheet placement unit.

Second Aspect

In the indicator according to the first aspect, the indication part has a mark indicating the center of the sheet to be set in the width direction. According to the present embodiment, the center of the sheet to be set in the width direction is likely to be aligned to a predetermined position.

Third Aspect In the indicator according to the second aspect, the mark is a straight line extending in the conveying direction. Accordingly, the mark indicating the center of the sheet to be set in the width direction can be visually recognized easily, and the sheet can be easily aligned in the width direction.

Fourth Aspect

The indicator according to any one of the first to third aspects further includes the press part such as the press rollers 154*a* and 154*b* to press the sheet placed on the sheet placement unit such as the document table 120. According to the present embodiment, the skew can be prevented while the sheet is being fed.

Fifth Aspect

The indicator according to the fourth aspect further includes a cover such as the cover 151*a* to cover the press part such as the press roller 154*a*. The indicator in any area other than the cover has a height lower than a height of the cover. As described in FIG. 16, as viewed from the other side in the width direction such as the front side of the image forming apparatus 1, one edge of the sheet in the width direction can be prevented from being hidden by the indicator such as the indication plate 151. Accordingly, a difference between the amount of protrusion from the indicator on one edge of the sheet in the width direction and the amount of protrusion from the indicator on the other edge of the sheet in the width direction can be easily recognized, and the sheet can be preferably set at a predetermined position in the width direction.

Sixth Aspect In the fourth or fifth aspect, the press part is a rotator such as a press roller. According to the present embodiment, the press part is rotated while the sheet is fed, and the sliding of the fed sheet with the press part can be prevented, and the occurrence of scraping of the sheet can be prevented. When the sheet of the mixed sheet bundle (mixed document bundle) is inserted between the indication plate 151 and the sheet placement unit, the press part is rotated with the inserted sheet. As a result, the sheet is likely to be inserted.

Seventh Aspect In the indicator according to any one of the first to sixth aspects, the indicator such as the indication plate 151 has an upstream edge in a sheet conveying direction. The center of the upstream edge is positioned at an upstream from an end of the upstream edge in a width direction perpendicular to the sheet conveying direction. Accordingly, as described in FIG. 14, when the leading edge of the sheet is curled upward, the leading edge of the sheet can be prevented from being bent, and the sheet can be inserted between the indicator such as the indication plate 151 and the sheet placement unit such as the document table 120 from the upstream side in the sheet conveying direction.

Eighth Aspect

In the indicator according to any one of the first to seventh aspects, the indicator has a width equal to or smaller than the minimum width of a sheet to be conveyed by a conveyor to convey a sheet placed on the sheet placement unit. Accordingly, as described with reference to FIG. 15, when the sheet having the minimum width is inserted between the indicator such as the indication plate 151 and the sheet placement unit such as the document table 120, both edges of the sheet in the width direction protrude from the indicator. Thus, in terms of the document having the minimum width, the position of the document in the width direction can be aligned while both portions adjacent to the indicator in the width direction is pressed with fingers. Accordingly, the document having the minimum width can be easily aligned.

Ninth Aspect

The indicator according to eighth aspect has a width equal to the minimum width of the sheet. According to the present embodiment, the center of the sheet to be set in the width direction is easy to be aligned to a predetermined position.

Tenth Aspect

A sheet feeder includes a sheet placement unit such as the document table 120 to place a sheet, a sheet feeding part such as the pickup roller 141 to feed the sheet placed on the sheet placement unit, and the indicator according to any one of the first to ninth aspects, such as the indication plate 151, including an indication part such as the cover 151*a* as an index indicating a predetermined position at which the sheet is to be set in the width direction of the sheet. According to the present embodiment, a sheet of the mixed sheet bundle, which is not restricted by the side fences, can be preferably set at a predetermined position in the width direction of the sheet. Further, when a sheet bundle including sheets having the same sheet width is set on the sheet placement unit such as the document table 120, the indicator does not interfere with the setting of the sheet.

Eleventh Aspect

The sheet feeder according to the tenth aspect, further includes an instruction to position the indicator such as the display label 159 to the first position when multiple sheets having different widths are placed on the sheet placement unit such as the document table 120. According to the present embodiment, when multiple sheets having different widths are placed on the sheet placement unit, the indicator is positioned at the first position based on the instruction such as the display label 159.

Twelfth Aspect

In the sheet feeder according to the eleventh aspect, the instruction such as the display label 159 instructs a user to align a center of the indicator with the center of the document in a width direction of the indicator. Accordingly, the center of the document in the width direction can be aligned with the conveying reference position.

Thirteenth Aspect

The sheet feeder according to any one of the tenth to twelfth aspects, a feeding speed at a time when multiple sheet having different widths is placed on the sheet placement unit is slower than a feeding speed at a time when the multiple sheet having a same width is placed on the sheet placement unit such as the document table. According to the present embodiment, the orientation of the sheet on the sheet placement unit such as the document table 120 before feeding, in which the sheet not restricted by the side fences, from losing. Accordingly, the skew of the sheet can be prevented while the sheet is fed, and sheet jam is prevented.

Fourteenth Aspect

An image reading device includes the sheet feeder according to any one of the tenth to thirteenth aspects and to feed a document sheet and an image reading unit to read an image on the document sheet fed from the sheet feeder. Accordingly, a sheet of the mixed sheet bundle, which is not restricted by the side fences, can be preferably set at a predetermined position in the width direction of the sheet, and the image on the document can be preferably read. Further, when a document bundle including documents having the same width is set on the sheet placement unit such as the document table 120, the indicator does not interfere with the setting of the sheet.

Fifteenth Aspect

An image forming apparatus includes the sheet feeder according to any one of the tenth to thirteenth aspects to feed a sheet, and an image forming unit to form an image on the sheet fed from the sheet feeder. Accordingly, a sheet of the mixed sheet bundle, which is not restricted by the side fences, can be preferably set at a predetermined position in the width direction of the sheet, and the image can be preferably formed on the sheet. Further, when a sheet bundle including sheets having the same width is set on the sheet placement unit, the indicator does not interfere with the setting of the sheet.

Sixteenth Aspect

A sheet feeder includes a sheet placement unit to place a sheet and an indicator indicating a predetermined position at which the sheet is to be set on the sheet placement unit. The indicator is movable between a first position at which the indicator is adjacent to or in contact with the sheet on the sheet placement unit and a second position farther than the first position from the sheet placement unit.

Seventeenth Aspect

In the sheet feeder according to the sixteenth aspect, the indicator has a mark indicating a center of the sheet to be set on the sheet placement unit in a width direction of the sheet.

Eighteenth Aspect

In the sheet feeder according to the seventeenth aspect, the mark has a straight line extending in a sheet conveying direction intersecting the width direction of the sheet.

Nineteenth Aspect

The sheet feeder according to any one of the sixteenth to eighteenth aspects, further includes a press part to press the sheet on the sheet placement unit to the sheet placement unit.

Twentieth Aspect

The sheet feeder according to the nineteenth aspect further includes a cover to cover the press part. The cover has a first height higher than a second height of the indicator other than the cover.

Twenty-First Aspect

In the sheet feeder according to any one of the nineteenth or twentieth aspect, the press part includes a rotator at the center of the sheet in the width direction.

Twenty-Second Aspect

In the sheet feeder according to any one of the sixteenth to twenty-first aspects, the indicator has an upstream end in the sheet conveying direction. A center of the upstream edge is positioned at an upstream from an end of the upstream edge in a width direction perpendicular to the sheet conveying direction.

Twenty-Third Aspect

The sheet feeder according to any one of the sixteenth to twenty-second aspects, further includes a conveyor to convey the sheet on the sheet placement unit. The indicator has a width equal to or smaller than a minimum width of the sheet to be conveyed by the conveyor.

Twenty-Fourth Aspect

In the sheet feeder according to the twenty-third aspect, the indicator has the width equal to the minimum width of the sheet.

Twenty-Fifth Aspect

A sheet feeder according to the sixteenth aspect further includes a sheet feeding part to feed the sheet on the sheet placement unit. The indicator indicates the predetermined position of the sheet on the sheet placement unit in a width direction of the sheet.

Twenty-Sixth Aspect

The sheet feeder according to the twenty-fifth aspect further includes a label with an instruction for positioning the indicator at the first position when multiple sheets having different widths are set on the sheet placement unit.

Twenty-Seventh Aspect

In the sheet feeder according to the twenty-sixth aspect, the label has the instruction for aligning a center of the indicator with a center of the sheet in the width direction.

Twenty-Eighth Aspect

In the sheet feeder according to any one of the twenty-fifth to twenty-seventh aspects, the sheet feeding part feeds multiple sheets having different widths on the sheet placement unit at a first feeding speed, and the sheet feeding part feeds multiple sheets having the same widths on the sheet placement unit at a second feeding speed faster than the first feeding speed.

Twenty-Ninth Aspect

An image reading device includes the sheet feeder according to any one of the twenty-fifth to twenty eighth aspects, to feed a document sheet and an image reading unit to read an image on the document sheet fed from the sheet feeder.

Thirtieth Aspect

An image forming apparatus includes the sheet feeder according to any one of the twenty-fifth to twenty-eighth aspects, to feed the sheet and an image forming unit to form an image on the sheet fed from the sheet feeder.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

The invention claimed is:

1. A sheet feeder comprising:

a sheet placement unit configured to place a sheet;

an indicator configured to indicate a predetermined position at which the sheet is to be set on the sheet placement unit, the indicator movable between a first position at which the indicator is adjacent to or in contact with the sheet on the sheet placement unit, and a second position farther than the first position from the sheet placement unit, the indicator including a pressing roller configured to press the sheet against the sheet placement unit, and the indicator having a mark indicating a center of the sheet to be set on the sheet placement unit in a width direction of the sheet; and a cover configured to cover the pressing roller, wherein the cover has a first height higher than a second height of the indicator other than the cover.

2. The sheet feeder according to claim 1, wherein the mark has a straight line extending in a sheet conveying direction intersecting the width direction of the sheet.

3. The sheet feeder according to claim 1, wherein the pressing roller includes a rotator at the center of the sheet in the width direction.

4. The sheet feeder according to claim 2, wherein the indicator has an upstream end in the sheet conveying direction, and the pressing roller is rotatably supported at a center of the upstream end of the indicator along the width direction perpendicular to the sheet conveying direction.

5. The sheet feeder according to claim 1, further comprising a conveyor configured to convey the sheet on the sheet placement unit, wherein the indicator has a first width equal to or smaller than a minimum width of the sheet to be conveyed by the conveyor.

6. The sheet feeder according to claim 5, wherein the first width of the indicator is equal to the minimum width of the sheet.

7. A sheet feeder comprising:

a sheet placement unit configured to place a sheet;

an indicator configured to indicate a predetermined position at which the sheet is to be set on the sheet placement unit, the indicator being movable between a first position at which the indicator is adjacent to or in contact with the sheet on the sheet placement unit, and a second position farther than the first position from the sheet placement unit, the indicator including a pressing roller configured to press the sheet against the sheet placement unit;

a sheet feeding part configured to feed the sheet on the sheet placement unit, wherein the indicator indicates the predetermined position of the sheet on the sheet placement unit in a width direction of the sheet; and a label with an instruction for positioning the indicator at the first position when multiple sheets having different widths are set on the sheet placement unit.

8. The sheet feeder according to claim 7, wherein the instruction is for aligning a center of the indicator with a center of the sheet in the width direction.

9. The sheet feeder according to claim 7, wherein the sheet feeding part is configured to feed multiple first sheets having different widths on the sheet placement unit at a first feeding speed, and the sheet feeding part is configured to feed multiple second sheets having a same width on the sheet placement unit at a second feeding speed faster than the first feeding speed.

10. An image reading device comprising:

the sheet feeder according to claim 1 configured to feed a document sheet; and an image reading unit configured to read an image on the document sheet fed from the sheet feeder.

11. An image forming apparatus comprising:

the sheet feeder according to claim 1 configured to feed the sheet; and an image forming unit configured to form an image on the sheet fed from the sheet feeder.

12. A sheet feeder comprising:

a sheet placement unit configured to place a sheet; and an indicator configured to indicate a predetermined position at which the sheet is to be set on the sheet placement unit, the indicator being movable between a first position at which the indicator is adjacent to or in contact with the sheet on the sheet placement unit, and a second position farther than the first position from the sheet placement unit, the indicator including a pressing roller configured to press the sheet against the sheet placement unit, wherein the pressing roller includes a first pressing roller and a second pressing roller.

13. The sheet feeder according to claim 12, wherein the first pressing roller and the second pressing roller are configured to press the sheet on the sheet placement unit against the sheet placement unit when the indicator is at the first position.

14. The sheet feeder according to claim 12, wherein the first pressing roller and the second pressing roller are rotatably supported on the indicator with a predetermined gap between the first pressing roller and the second pressing roller along a sheet conveying direction.

15. The sheet feeder according to claim 14, wherein the first pressing roller and the second pressing roller are rotatably supported on the indicator at a center position of the indicator in a width direction of the sheet when the indicator is at the first position.

* * * * *